(12) United States Patent
Deshpande

(10) Patent No.: US 10,780,772 B2
(45) Date of Patent: Sep. 22, 2020

(54) VEHICLE ENGINE ASSIST SYSTEM

(71) Applicant: General Electric Company, Schenectady, NY (US)

(72) Inventor: Sharath Srinivas Deshpande, Bangalore (IN)

(73) Assignee: GE GLOBAL SOURCING LLC, Norwalk, CT (US)

( * ) Notice: Subject to any disclaimer, the term of this patent is extended or adjusted under 35 U.S.C. 154(b) by 149 days.

(21) Appl. No.: 16/168,019

(22) Filed: Oct. 23, 2018

(65) Prior Publication Data

US 2020/0122749 A1 Apr. 23, 2020

(51) Int. Cl.
| | |
|---|---|
| *B60K 6/485* | (2007.10) |
| *B60W 30/18* | (2012.01) |
| *B61C 3/02* | (2006.01) |
| *B61C 5/00* | (2006.01) |
| *B61C 7/04* | (2006.01) |
| *B61C 17/06* | (2006.01) |
| *B60W 20/15* | (2016.01) |
| *B61C 17/12* | (2006.01) |
| *B60K 6/28* | (2007.10) |
| *B60L 7/10* | (2006.01) |
| *B60L 15/20* | (2006.01) |
| *B60L 58/12* | (2019.01) |
| *B60L 50/10* | (2019.01) |
| *B60L 7/12* | (2006.01) |
| *B60L 7/14* | (2006.01) |
| *B60W 20/16* | (2016.01) |

(52) U.S. Cl.
CPC .............. *B60K 6/485* (2013.01); *B60K 6/28* (2013.01); *B60L 7/10* (2013.01); *B60L 15/2009* (2013.01); *B60L 50/10* (2019.02); *B60L 58/12* (2019.02); *B60W 20/15* (2016.01); *B60W 30/18127* (2013.01); *B61C 3/02* (2013.01); *B61C 5/00* (2013.01); *B61C 7/04* (2013.01); *B61C 17/06* (2013.01); *B61C 17/12* (2013.01); *B60L 7/12* (2013.01); *B60L 7/14* (2013.01); *B60L 2240/421* (2013.01); *B60L 2240/423* (2013.01); *B60L 2240/441* (2013.01); *B60L 2240/443* (2013.01); *B60W 20/16* (2016.01)

(58) Field of Classification Search
None
See application file for complete search history.

(56) References Cited

U.S. PATENT DOCUMENTS

| 6,376,927 B1 * | 4/2002 | Tamai | ..................... F16H 45/02 |
|---|---|---|---|
| | | | 290/400 |
| 6,516,254 B1 * | 2/2003 | Wakashiro | ............. B60K 6/485 |
| | | | 701/22 |

(Continued)

*Primary Examiner* — Kevin R Steckbauer
(74) *Attorney, Agent, or Firm* — Christopher R. Carroll; The Small Patent Law Group LLC

(57) ABSTRACT

A locomotive propulsion system includes an engine assisting apparatus and an engine control unit that monitors an output parameter of a locomotive engine. The control unit determines whether the engine output decreases sufficiently low to at least partially de-fuel the engine and to activate an assisting apparatus. This assisting apparatus rotates a shaft of the engine with or without the engine also rotating the shaft. Rotation of the shaft by the assisting apparatus can be used to power traction motors or other loads of the locomotive while reducing fuel consumption and/or emission generation by the engine.

19 Claims, 3 Drawing Sheets

(56) References Cited

U.S. PATENT DOCUMENTS

| | | | | |
|---|---|---|---|---|
| 6,616,570 | B2* | 9/2003 | Wakashiro | F01L 13/0005 477/5 |
| 6,687,603 | B2* | 2/2004 | Wakashiro | B60K 6/485 701/110 |
| 6,857,491 | B2* | 2/2005 | Wakashiro | B60K 6/485 123/198 DB |
| 6,886,524 | B2* | 5/2005 | Hanada | B60K 6/485 123/198 F |
| 6,886,649 | B2* | 5/2005 | Wakashiro | B60K 6/485 123/198 F |
| 6,934,610 | B2* | 8/2005 | Wakashiro | B60K 6/48 701/22 |
| 6,943,460 | B2* | 9/2005 | Wakashiro | B60K 6/485 290/400 |
| 6,953,021 | B2* | 10/2005 | Wakashiro | B60W 30/18127 123/321 |
| 7,070,537 | B2* | 7/2006 | Polom | F02D 41/0087 477/3 |
| 7,104,244 | B2* | 9/2006 | Nishi | F02D 13/06 123/198 F |
| 7,377,250 | B1* | 5/2008 | Duffy | B60K 6/46 123/192.1 |
| 8,546,973 | B2* | 10/2013 | Lee | B60K 6/485 307/10.1 |
| 8,622,862 | B2* | 1/2014 | Koyama | B60K 6/36 475/5 |
| 8,880,258 | B2* | 11/2014 | Breton | B60W 20/10 701/22 |
| 9,073,546 | B2* | 7/2015 | Kuroda | B60K 6/48 |
| 9,206,584 | B2* | 12/2015 | Kawaguchi | B60W 20/00 |
| 9,617,714 | B2* | 4/2017 | Ishihara | B60W 20/13 |
| 9,919,701 | B2* | 3/2018 | Kuroda | B60K 6/48 |
| 10,041,423 | B2* | 8/2018 | Eo | B60W 10/06 |
| 10,060,095 | B2* | 8/2018 | Imura | B60W 10/08 |
| 10,060,368 | B2* | 8/2018 | Pirjaberi | F02D 41/3058 |
| 10,196,995 | B2* | 2/2019 | Pirjaberi | B60W 20/15 |
| 10,272,900 | B2* | 4/2019 | Kaneko | B60K 6/46 |
| 10,315,508 | B2* | 6/2019 | Yoshida | B60K 6/485 |
| 10,337,432 | B2* | 7/2019 | Naidu | F02D 29/06 |
| 10,436,133 | B2* | 10/2019 | Pirjaberi | F02D 41/3058 |
| 2002/0112902 | A1* | 8/2002 | Wakashiro | B60K 6/485 180/65.26 |
| 2002/0112903 | A1* | 8/2002 | Wakashiro | B60K 6/543 180/65.26 |
| 2002/0115532 | A1* | 8/2002 | Wakashiro | F01L 13/0005 477/111 |
| 2002/0116112 | A1* | 8/2002 | Wakashiro | F01L 13/0005 701/110 |
| 2003/0028295 | A1* | 2/2003 | Wakashiro | B60K 6/543 701/22 |
| 2004/0012206 | A1* | 1/2004 | Wakashiro | B60W 10/26 290/400 |
| 2004/0026928 | A1* | 2/2004 | Wakashiro | B60K 6/543 290/400 |
| 2004/0035113 | A1* | 2/2004 | Hanada | B60K 6/485 60/698 |
| 2005/0164828 | A1* | 7/2005 | Polom | F02D 41/0087 477/3 |
| 2006/0107919 | A1* | 5/2006 | Nishi | F02D 13/06 123/198 F |
| 2011/0115288 | A1* | 5/2011 | Lee | B60K 6/485 307/10.1 |
| 2012/0004063 | A1* | 1/2012 | Koyama | B60L 7/24 475/5 |
| 2013/0096759 | A1* | 4/2013 | Breton | B60K 6/28 701/22 |
| 2015/0081147 | A1* | 3/2015 | Kawaguchi | B60L 50/16 701/22 |
| 2015/0354170 | A1* | 12/2015 | Ishihara | E02F 9/2217 701/22 |
| 2017/0088115 | A1* | 3/2017 | Kaneko | B60W 20/10 |
| 2017/0145658 | A1* | 5/2017 | Imura | F02D 29/04 |
| 2017/0254279 | A1* | 9/2017 | Naidu | B60L 53/53 |
| 2017/0274755 | A1* | 9/2017 | Yoshida | B60L 50/50 |

* cited by examiner

VEHICLE ENGINE ASSIST SYSTEM

FIELD

Embodiments of the subject matter disclosed herein relate to engines, such as vehicle engines.

BACKGROUND

Idling engines and engines operating at low power can inefficiently consume fuel. Reducing or eliminating idling time decreases fuel expenses, engine maintenance, and pollution. Some engines may be kept running at idle or low power for various reasons, including keeping locomotive cabin climates warm or cool as needed during layovers, powering onboard electrical accessories, avoiding potential engine problems during startup, and avoiding long startup times when a locomotive engine's operational routine includes frequent starts and stops. Idling can represent nearly 40% of locomotive use, resulting in fuel being mostly consumed to meet friction and pumping losses while the locomotive remains still. Similar inefficiencies are also found at low engine power.

BRIEF DESCRIPTION

In one embodiment, a locomotive propulsion system includes an engine assisting apparatus. The locomotive propulsion system also includes an engine control unit configured to monitor a speed at which an engine of a locomotive rotates a shaft of the engine. The shaft of the engine is operatively coupled with one or more power-generating devices that convert rotation of the shaft into electric current that powers one or more traction motors that propel the locomotive. The engine control unit is also configured to determine whether the speed at which the engine rotates the shaft decreases to or below a designated lower threshold that is greater than an idle speed of the engine, to direct a fuel system of the engine to stop supplying fuel to one or more cylinders of the engine responsive to the speed at which the engine rotates the shaft decreasing to or below the designated lower threshold, and to direct an assisting motor to begin rotating the shaft of the engine responsive to (a) the speed at which the engine rotates the shaft decreasing to or below the designated lower threshold and (b) the fuel system stopping supply of the fuel to the one or more cylinders of the engine.

In one embodiment, a vehicle propulsion system can include an engine, an assisting apparatus configured to be coupled with a shaft of a locomotive engine to rotate the shaft of the engine, an engine control unit configured to monitor a power setting of the engine, one or more starting batteries, and an energy storage device (ESD).

In one embodiment, a method includes monitoring a power setting of an engine onboard a locomotive, determining whether the power setting of the engine is no greater than a designated upper threshold, directing a fuel s of the engine to stop fueling the engine responsive to the power setting of the engine dropping to or below the upper threshold, and directing an assisting apparatus onboard the locomotive to begin rotating a shaft of the engine responsive to the power setting of the engine dropping to or below the upper threshold.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

A locomotive propulsion system includes an engine assisting apparatus and an engine control unit that monitors an output parameter of a locomotive engine. The control unit determines whether the engine output decreases sufficiently low to at least partially de-fuel the engine and to activate an assisting apparatus. This assisting apparatus rotates a shaft of the engine with or without the engine also rotating the shaft. Rotation of the shaft by the assisting apparatus can be used to meet friction and pumping losses (e.g., for quick return of the engine to full fueling operation), and/or to power traction motors or other loads of the locomotive, while reducing fuel consumption and/or emission generation by the engine.

One or more embodiments of the inventive subject matter described herein relate to propulsion systems for vehicles, such as rail vehicles (e.g., locomotives). Rail vehicles idle for a significant amount of time during cycle duty, at times approaching 40%. Idling is necessary but not limited to running electric devices onboard the rail vehicle during layovers, such as heating and cooling systems (HVAC), lights; maintaining climate conditions; and charging batteries via alternators. Also, cold weather conditions create a need for idling to keep diesel engine parts from freezing, since water may be used for cooling in lieu of antifreeze.

There are many reasons to reduce or eliminate locomotive idling. During idle, locomotives consume significant amounts of fuel while not in motion. Trains may use hundreds of gallons of fuel per week during idle conditions. Also, locomotive engines experience wear and tear on various parts even while idling. Additionally, an idling locomotive consuming fuel while stationary may also produce emissions that are subject to government regulations and/or otherwise undesirable.

One or more embodiments of the inventive subject matter described herein provide a propulsion system for a locomotive. As described herein, the locomotive propulsion systems described herein can significantly reduce emissions from idling locomotive engines, wear and tear on locomotive engines, and fuel consumption.

Figure 1:
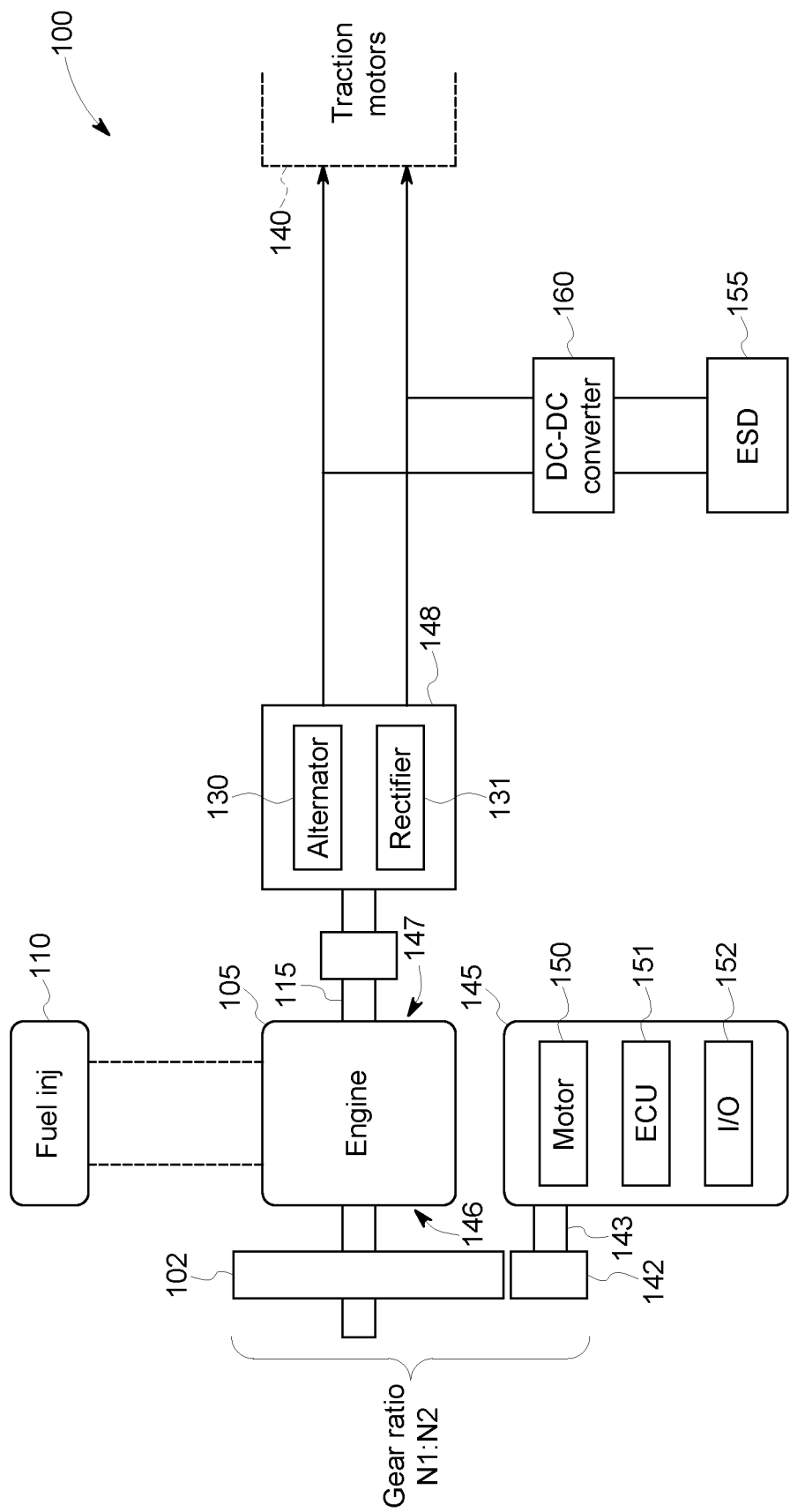
FIG. 1 illustrates one example of a locomotive propulsion system.

FIG. 1 illustrates one example of a locomotive propulsion system 100 that includes one embodiment of an engine assisting apparatus 145. The locomotive propulsion system 100 is shown as a part of a rail vehicle that propels the rail vehicle (e.g., a locomotive), but alternatively, the vehicle may be an automobile, a semi-truck, a bus, or another type of heavy-duty vehicle (e.g., a vehicle with a fuel consuming engine likely to idle for significant periods of time). Although the description herein focuses on the propulsion system 100 of a locomotive, not all embodiments of the inventive subject matter are limited to locomotives or rail vehicles. Thus, all references herein to locomotives are also applicable to vehicles more generally.

The locomotive propulsion system 100 includes components such as one or more engines, alternators, generators, traction motors, gear boxes (holding gears that translate rotary motion created by an engine or motor into rotary motion of vehicle wheels and/or axles), etc., that operate to propel a vehicle. The locomotive propulsion system 100 may be supplied with fuel, electrical current from one or more batteries, or the like, as sources of energy to power the locomotive propulsion system 100. In an embodiment, the locomotive propulsion system 100 includes an engine 105 mechanically coupled to an engine shaft 115. The locomotive engine shaft 115 may be mechanically coupled to a gear box 102, which may include gears, cogs, or the like, for translating rotary motion of the shaft 115 to another rotary motion or other motion. Alternatively, the gear box 102 may be a gear and not an entire gear box.

Also included in the locomotive propulsion system 100 are one or more power-generating devices 130, such as an alternator, a generator, or the like. The alternator 130 and a rectifier 131 are operatively coupled to the locomotive engine shaft 115. A DC-DC converter 160 and one or more electric storage devices (ESD) 155 also can be included in the locomotive propulsion system 100. The ESD 155 may include but is not limited to batteries, capacitors, or the like. The engine assisting apparatus 145 is mechanically coupled to another gear box 142. In an embodiment, the gear box 142 may be a gear that meshes with the gear box 102. The gear boxes 102 and 142 may contain one or more toothed gears or cogs that mesh with other devices having gears or cogs connected to the locomotive engine shaft 115 or each other. The gear boxes 102 and 142 can mesh and translate rotation of the motor shaft 143 to rotation of the locomotive engine shaft 115. Finally, one or more traction motors 140 can be included in the locomotive propulsion system 100. The traction motors 140 can be coupled with axles, wheels, or the like, to propel the vehicle along one or more routes.

In an embodiment, the engine assisting apparatus 145 may comprise an electric motor 150 and an engine control unit (ECU) 151. The electric motor 150 represents an electrical machine that converts electrical energy into mechanical energy at a motor shaft 143. The electric motor 150 may receive electrical energy from one or more of the ESDs 155 and/or from another source. The electrical energy powers the electric motor 150 to generate rotational energy or torque that rotates a mechanically coupled motor shaft 143 as directed by the ECU 151. The ECU 151 represents hardware circuitry that includes and/or is connected with one or more processors (e.g., one or more microprocessors, field programmable gate arrays, integrated circuits, or the like), that control operation of the locomotive propulsion system 100.

The ECU 151 may receive input from an operator onboard and/or off-board the locomotive propulsion system 100 via one or more input and/or output devices 152 and, based on the input, change the propulsive force or effort (e.g., torque, power, output, tractive effort, or the like) generated by the locomotive propulsion system 100. Alternatively, the ECU 151 may automatically change the propulsive force or effort generated by the locomotive propulsion system 100 based on preprogrammed parameters and/or sensed characteristics of the operating environment or conditions of the vehicle. The input and/or output devices 152 can represent one or more touchscreens, display devices, keyboards, pedals, levers, switches, buttons, microphones, speakers, or the like, that receive information from an operator and/or provide information to the operator.

Additionally, in an embodiment, the engine assisting apparatus 145 is configured to mechanically interconnect with the locomotive engine shaft 115 in a location that is upstream of the locomotive engine 105 such that the locomotive engine 105 is located between the engine assisting apparatus 145 and the alternator 130 along the locomotive engine shaft 115. The locomotive engine 105 has a fore side 146 and an aft side 147. Extending from the fore side 146 of the locomotive engine 105 may be the locomotive engine shaft 115 that is operatively connected to the gear box 102. Alternatively, the portion of the shaft 115 shown projecting from the fore side 146 may be another shaft that is coupled with the shaft 115. The gear box 102 meshes with the gear box 142, which is operatively connected with the motor shaft 143. The motor shaft 143 extends from the engine assisting apparatus 145 and is connected with the portion of the engine shaft 115 protruding from the fore side 146 of the engine 105 by the gear box 102 and the gear box 142. This configuration allows the engine assisting apparatus 145 to rotate the locomotive engine shaft 115 as directed. The locomotive engine shaft 115 also extends from the aft side 147 of the locomotive engine 105. The locomotive shaft 115 may be operatively connected to a power-generating device, such as an alternator 130, a generator, and the like. Optionally, the engine assisting apparatus 145 may be configured to mechanically interconnect with the locomotive engine shaft 115 in a location that is downstream of the locomotive engine 105 such that the engine assisting apparatus 145 is operatively connected to the locomotive engine shaft 115 on the aft side 147 of the locomotive engine 105 and a fore side 148 of the alternator 130.

In an embodiment, the engine 105 represents a machine that combusts fuel to produce mechanical energy. This mechanical energy is at least partially utilized to rotate the locomotive engine shaft 115. Fuel may be provided to cylinders of the engine 105 by a fuel system, e.g., a fuel system having one or more fuel injectors 110. The amount of fuel provided to the engine 105 by the fuel injectors 110 can be controlled by the ECU 151. (Alternatively, the fuel system may include some other type of controllable apparatus for providing fuel to the engine cylinders, such as a carburetor.)

In an embodiment, the alternator 130 may be a rotating alternating current (AC) machine utilizing mechanical energy generated from the rotating locomotive engine shaft 115 to provide power to other electrical devices, such as the traction motors 140. The AC output from the alternator 130 may be converted into direct current (DC) with a rectifier 131 for use with the traction motors 140. The traction motors 140 can utilize the DC output from the rectifier 131. On the other hand, the AC traction motors 140 can utilize DC output from the rectifier 131 after the DC output has undergone a 3-phase AC conversion via an inverter.

In an embodiment, the traction motors 140 represent electric power devices that consume electric power to generate the torque that propels the vehicle. Additionally, the traction motors 140 can be either AC or DC motors fed by either AC or DC output from the rectifier 131 (as converted by an inverter or other voltage converter). Also, the traction motors 140 can be coupled with vehicle axles to rotate the axles and wheels for vehicle propulsion.

In another embodiment, the traction motors 140 may represent electric power devices that can generate electric power using regenerative braking. For example, the one or more traction motors 140 may charge the one or more ESDs 155 during regenerative braking of the locomotive.

In an embodiment, the DC-DC converter 160 represents an electrical device that converts a DC output from one voltage to another voltage. For example, the alternator 130 and the rectifier 131 may supply DC power to the DC-DC converter 160 at a higher voltage than what is necessary for a downstream electrical device. The DC-DC converter 160 can temporarily store the incoming voltage and output the voltage at a desired level. Further, the DC-DC converter 160 can move electric power in one direction, such as a battery providing power to a device and being depleted in the process. Conversely, the DC-DC converter 160 can move electric power in a bidirectional manner, such as in a regenerative braking system.

In an embodiment, the ESD 155 represents a device that can store electrical energy. The ESD 155 may be a rechargeable battery, capacitor, flywheel, or the like. The ESD 155 in conjunction with the DC-DC converter 160 may provide a system that provides power to a device such as the engine assisting apparatus 145, while being charged by the alternator 130 and the rectifier 131 as directed by the ECU 151.

In operation, the ECU 151 monitors the engine output parameter at which the engine 105 operates (e.g., rotates the engine shaft 115). Optionally, the ECU 151 can monitor a throttle or speed setting at which the operator and/or the ECU 151 directs the engine 105 to operate. The engine power, throttle setting, and speed can each be referred to as an engine output parameter of the engine 105. Responsive to the engine output parameter remaining above an upper designated threshold, the ECU 151, based on preprogrammed parameters or an operator using the input/output device 152, directs the motor 150 to remain inactive and not rotate the shaft 143. For example, the ECU 151 can direct the fuel injector(s) 110 to continue providing fuel to the locomotive engine 105 to propel the vehicle while the motor 150 is not rotating the engine shaft 115. The active locomotive engine 105 can rotate the mechanically coupled engine shaft 115 to propel the vehicle.

The rotational energy from the rotating engine shaft 115 can be used by the mechanically coupled alternator 130 and the rectifier 131 to generate electric current. The alternator 130 converts the rotational energy input from the rotating engine shaft 115 into electric current. The rectifier 131 can modify this current into another current supplied to the traction motors 140 to power the traction motors 140. The traction motors 140 are powered to rotate mechanically coupled axles, thereby propelling the vehicle. Further, the DC-DC converter 160 can convert at least some of the electric energy from the rectifier 131 to recharge the ESD 155.

Responsive to the engine output parameter decreasing to or below the upper threshold (but remaining above a lower threshold, as described below), the ECU 151 can direct the assisting apparatus 145 to assist the engine 205 to rotate the shaft of the engine. The ECU 151 optionally can direct one or more of the fuel injectors 110 to stop supplying fuel to one or more cylinders of the engine 105. For example, the ECU 151 may partially de-fuel the engine 105 by directing some, but not all, of the fuel injectors 110 to stop directing fuel into one or more, but not all, of the cylinders of the engine 105. The motor 150 may be powered by current from the ESD 255. The ECU 151 can perform this operation automatically (e.g., without operator intervention), or under direction of the operator. The motor 150 and the locomotive engine 105 can both rotate the engine shaft 115 as directed by the ECU 151 in one embodiment. The ECU 151 can direct one or more of the fuel injectors 110 to continue supplying fuel to some, but not all, of the cylinders of the engine 105. For example, instead of completely or fully turning off the engine and not supplying fuel to any of the cylinders of the engine 105, the ECU 151 can direct at least one, but not all, of the fuel injectors 110 to continue supplying fuel into one or more of the engine cylinders to rotate the engine shaft 115 while the motor 150 of the engine assisting apparatus 145 also rotates the engine shaft 115. This can result in both the engine 105 and the shaft 143 of the engine assisting apparatus 145 concurrently rotating the engine shaft 115. Because the motor 150 of the engine assisting apparatus 145 is helping rotate the engine shaft 115 (which is then used to power the traction motors 140 via the alternator 130 or generator), less fuel may be consumed to propel the vehicle at the same engine output parameter when compared with the engine shaft 115 being rotated without the assistance of the motor 150.

Responsive to the engine output parameter decreasing to or below the lower threshold the ECU 151 can direct the fuel injector(s) 110 to not provide fuel to the locomotive engine 105, which can remain stationary (in the sense of the cylinders not being fueled for combustion) and not rotate the shaft 115. The lower threshold may represent the locomotive engine 105 operating at idle in one embodiment. Because the engine assisting apparatus 145 is active at the lower threshold and remains active above the lower threshold until exceeding the upper threshold, the ECU 151 directs the engine assisting apparatus 145 to continue rotating the engine shaft 115. The gear boxes 102 and 142 mesh together, so that the motor 150 rotates the locomotive engine shaft 115.

In operation, a locomotive may have several throttle levels (generally correlating to operating speeds) represented by notches N0 to N8, where N0 represents idle and N8 represents a maximum throttle level (corresponding to the rapid-most speed at which the locomotive moves). In one embodiment, N0 may represent the lower threshold and N3 may represent the upper threshold described above. The locomotive may begin operating at idle or N0. During idle, the ECU 151 may direct the engine assisting apparatus 145 to rotate the engine shaft 115 via the motor shaft 143 and the gear boxes 142 and 102. The ECU 151 may also direct the fuel injector(s) 110 to provide no fuel to the cylinders of the locomotive engine 105, thereby causing the engine 105 to not rotate the engine shaft 115. The locomotive operator may increase the speed of the locomotive to N1, N2, or N3. The ECU 151 may then direct the fuel injector(s) 110 to provide fuel for one or more, but not all, of the cylinders of the locomotive engine 105. During operation at notch N1, N2, or N3, both the locomotive engine 105 and the engine assisting apparatus 145 may rotate the engine shaft 115. The locomotive operator may continue to increase the speed of the locomotive, during which the ECU 151 may direct the fuel injector(s) 110 to provide more fuel to the cylinders of the locomotive engine 105. The ECU 151 will direct the assisting apparatus to continue assisting the locomotive engine 105 while the locomotive operates at N3 or below. In this example, an upper threshold may be N3. Once the upper threshold is exceeded, the ECU 151 may direct the engine assisting apparatus 145 to no longer rotate the engine shaft 115. At notches exceeding N3, the ECU 151 may direct the fuel injector(s) 110 to provide fuel to more or all cylinders within the locomotive engine 105, which can rotate the engine shaft 115 without assistance from the engine assisting apparatus 145. As the locomotive slows down, however, the ECU 151 may evaluate the need to assistance and direct the engine assisting apparatus 145 and the locomotive engine 105 to accordingly rotate or not rotate the locomotive engine shaft 115.

Figure 2:
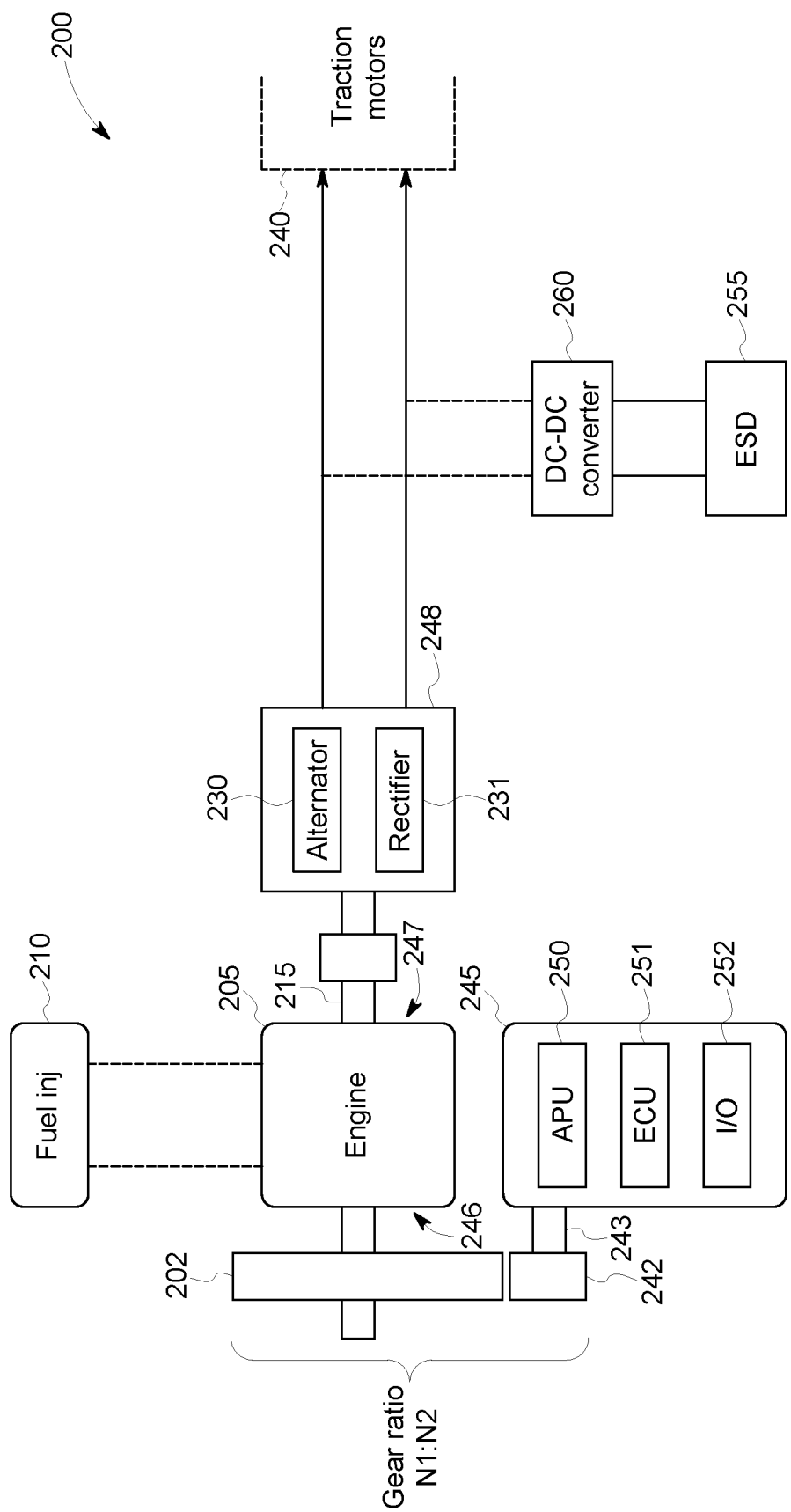
FIG. 2 illustrates another example of a locomotive propulsion system.

FIG. 2 illustrates an example of a locomotive propulsion system 200 having another embodiment of an engine assisting apparatus 245. The locomotive propulsion system 200 is shown as part of a rail vehicle that propels the rail vehicle (e.g., a locomotive), but alternatively, the vehicle may be an automobile, a semi-truck, a bus, or another type of heavy-duty vehicle (e.g., a vehicle with a fuel consuming engine likely to idle for significant periods of time). Although the description herein focuses on the locomotive propulsion system 200 of a locomotive, not all embodiments of the inventive subject matter are limited to locomotives or rail vehicles.

The locomotive propulsion system 200 includes components such as one or more engines, alternators, generators, traction motors, gear boxes (holding gears that translate rotary motion created by an engine or motor into rotary motion of vehicle wheels and/or axles), etc., that operate to propel a vehicle. The locomotive propulsion system 200 may be supplied with fuel, electrical current from one or more batteries, or the like, as sources of energy to power the locomotive propulsion system 200. In an embodiment, the locomotive propulsion system 200 includes an engine 205 mechanically coupled to an engine shaft 215. The locomotive engine shaft 215 may be mechanically coupled to a gear box 202, which may include gears, cogs, or the like, for translating rotary motion of the shaft 215 to another rotary motion or other motion. Alternatively, the gear box 202 may be a gear and not an entire gear box.

Also included in the locomotive propulsion system 200 are one or more power-generating devices 230, such as an alternator, a generator, or the like. The alternator 230 and a rectifier 231 are operatively coupled to the locomotive engine shaft 215. A DC-DC converter 260 and one or more electric storage devices (ESD) 255 also can be included in the locomotive propulsion system 200. The ESD 255 may include but is not limited to batteries, capacitors, or the like. The engine assisting apparatus 245 is mechanically coupled to another gear box 242. In an embodiment, the gear box 242 may be a gear that meshes with the gear box 202. The gear boxes 202 and 242 may contain one or more toothed gears or cogs that mesh with other devices having gears or cogs connected to the locomotive engine shaft 215 or each other. The gear boxes 202 and 242 can mesh and translate rotation of a motor shaft 243 to rotation of the locomotive engine shaft 215. Finally, one or more traction motors 240 are included in the locomotive propulsion system 200. The traction motors 240 can be coupled with axles, wheels, or the like, to propel the vehicle along one or more routes.

In an embodiment, the engine assisting apparatus 245 may comprise an auxiliary power unit (APU) 250 and an engine control unit (ECU) 251. The APU 250 represents a small machine that provides power to rotate the locomotive engine shaft 215 as directed by the ECU 251. The APU 250 may comprise a small engine, such as a diesel or gasoline powered engine, that provides torque that rotates a mechanically coupled APU shaft 243 as directed by the ECU 251. Optionally, the APU 250 may comprise a system comprising one or more small motors operatively coupled to the APU shaft 243 to rotate the mechanically coupled APU shaft 243 as directed by the ECU 251. ("Small" being relative, such as having a smaller power output then the engine of the vehicle that provides power to move the vehicle, or a smaller power output than traction motors of the vehicle, as applicable.) The ECU 251 represents hardware circuitry that includes and/or is connected with one or more processors (e.g., one or more microprocessors, field programmable gate arrays, integrated circuits, or the like) that operate to control movement of the locomotive propulsion system 200.

The ECU 251 may receive input from an operator onboard and/or off-board the locomotive propulsion system 200 via one or more input and/or output devices 252 and, based on the input, change the propulsive force or effort (e.g., torque, power, output, tractive effort, or the like) generated by the locomotive propulsion system 200. Alternatively, the ECU 251 may automatically change the propulsive force or effort generated by the locomotive propulsion system 200 based on preprogrammed parameters and/or sensed characteristics of the operating environment or conditions of the vehicle. The input and/or output devices 252 can represent one or more touchscreens, display devices, keyboards, pedals, levers, switches, buttons, microphones, speakers, or the like, that receive information from an operator and/or provide information to the operator.

Additionally, in an embodiment, the engine assisting apparatus 245 is configured to mechanically interconnect with the locomotive engine shaft 215 in a location that is upstream of the locomotive engine 205 such that the locomotive engine 205 is located between the engine assisting apparatus 245 and the alternator 230 along the locomotive engine shaft 215. The locomotive engine 205 has a fore side 246 and an aft side 247. Extending from the fore side 246 of the locomotive engine 205 may be the locomotive engine shaft 215 that is operatively connected to the gear box 202. Optionally, another shaft can extend from the fore side 246 of the engine 205 (that is coupled with the engine shaft 215). The gear box 202 meshes with the gear box 242, which is operatively connected with the motor shaft 243. The motor shaft 243 extends from the engine assisting apparatus 245 and is connected with the portion of the engine shaft 215 protruding from the fore side 246 of the engine 215 by the gears 202 and 242. This configuration allows the engine assisting apparatus 245 to rotate the locomotive engine shaft 215 as directed. The locomotive engine shaft 215 also extends from the aft side 247 of the locomotive engine 205. The locomotive shaft 215 may be operatively connected to a power-generating device, such as an alternator 230, a generator, or the like. Optionally, the engine assisting apparatus 245 may be configured to mechanically interconnect with the locomotive engine shaft 215 in a location that is downstream of the locomotive engine 205 such that the assisting apparatus 245 is operatively connected to the locomotive engine shaft 215 on the aft side 247 of the locomotive engine 205 and a fore side 248 of the alternator 230.

In an embodiment, the engine 205 represents a machine that combusts fuel to produce mechanical energy. This mechanical energy is at least partially utilized to rotate the locomotive engine shaft 215. Fuel may be provided to the locomotive engine 205 by a fuel system, e.g., a fuel system having one or more fuel injectors 210, or that is otherwise controllable to vary an amount of fuel for combustion (e.g., a carburetor). The amount of fuel provided to the engine 205 by the fuel injectors 210 can be controlled by the ECU 251.

In an embodiment, the alternator 230 may be a rotating AC machine utilizing mechanical energy generated from the rotating locomotive engine shaft 215 to provide power to other electrical devices, such as the traction motors 240. The AC output from the alternator 230 may be converted into DC with the rectifier 231 for use with the traction motors 240. The traction motors 240 can utilize the DC output from the rectifier 231. On the other hand, the AC traction motors 240 can utilize DC output from the rectifier 231 after the DC output has undergone a 3-phase AC conversion via an inverter.

In an embodiment, the traction motors 240 represent electric power devices that consume electric power to generate the torque that propels the vehicle. Additionally, the traction motors 240 can be either AC or DC motors fed by either AC or DC output from the rectifier 231. Also, the traction motors 240 can be coupled with vehicle axles to rotate the axles and wheels for vehicle propulsion.

In another embodiment, the traction motors 240 may represent electric power devices that can generate electric power using regenerative braking. For example, the one or more traction motors 240 may charge the one or more ESDs 255 during regenerative braking of the locomotive.

In an embodiment, the DC-DC converter 260 represents an electrical device that converts a DC output from one voltage to another voltage. For example, the alternator 230 and the rectifier 231 may supply DC power to the DC-DC converter 260 at a higher voltage than what is necessary for a downstream electrical device. The DC-DC converter 260 can temporarily store the incoming voltage and output the voltage at a desired level. Further, the DC-DC converter 260 can move electric power in one direction, such as a battery providing power to a device and being depleted in the process. Conversely, the DC-DC converter 260 can move electric power in a bidirectional manner, such as in a regenerative braking system.

In an embodiment, the ESD 255 represents a device that can store electrical energy. The ESD 255 may be a rechargeable battery, capacitor, flywheel, or the like. The ESD 255 in conjunction with the DC-DC converter 260 may provide a system that provides power to a device such as the locomotive assisting apparatus 245, while being charged by the alternator 230 and the rectifier 231 as directed by the ECU 251.

In operation, the ECU 251 monitors the engine output parameter at which the engine 205 operates (e.g., rotates the engine shaft 215). Optionally, the ECU 251 can monitor a throttle or speed setting at which the operator and/or the ECU 251 directs the engine 205 to operate. The engine power, throttle setting, and speed can each be referred to as an engine output parameter of the engine 205. Responsive to the engine output parameter remaining above a designated upper threshold, the ECU 251, based on preprogrammed parameters or an operator using the input/output device 252, directs the APU 250 to remain inactive and not rotate the shaft 243. For example, the ECU 251 can direct the fuel injector(s) 210 to continue providing fuel to the locomotive engine 205 to propel the vehicle while the APU 250 is not rotating the engine shaft 215. The active locomotive engine 205 can rotate the mechanically coupled engine shaft 215.

The rotational energy from the rotating engine shaft 215 can be used to power the mechanically coupled alternator 230 and the rectifier 231. The alternator 230 takes rotational energy input from the rotating engine shaft 215 and converts the rotational energy into electric current. The rectifier 231 can modify this current into another current supplied to the traction motors 240 to power the traction motors 240. The traction motors 240 are powered to rotate mechanically coupled axles, thereby propelling the vehicle. Further, the DC-DC converter 260 can convert at least some of the electric energy from the rectifier 231 to recharge the ESD 255.

Responsive to the engine output parameter decreasing to or below the upper threshold (but remaining above a lower threshold, as described below), the ECU 251 can direct the APU 250 to assist the engine 205 to rotate the engine shaft 215. The ECU 251 optionally can direct one or more of the fuel injectors 210 to stop supplying fuel to one or more cylinders of the engine 205. For example, the ECU 251 may partially de-fuel the engine 205 by directing some, but not all, of the fuel injectors 210 to stop directing fuel into one or more, but not all, of the cylinders of the engine 205. The APU 250 may be powered by current from the ESD 255. The ECU 251 can perform this operation automatically (e.g., without operator intervention) and/or under direction of the operator. The mechanically coupled APU shaft 243 and the gear box 242 are rotated by the APU 250. The gear box 202 meshes with the gear box 242 so that rotation of the gear box 242 rotates the gear box 202. The gear box 202 is coupled with the engine shaft 215 so that rotation of the gear box 202 also rotates the engine shaft 215. The engine 205 may concurrently rotate the engine shaft 215 such that both the APU 250 and the locomotive engine 205 concurrently rotate the engine shaft 215 as directed by the ECU 251. This can reduce the amount of fuel needed by the engine 205 to maintain or provide the engine output parameter dictated by the ECU 251 and/or operator of the vehicle.

Responsive to the engine output parameter decreasing to (or below) the lower threshold, the ECU 251 can direct the fuel injector(s) 210 to not provide fuel to the locomotive engine 205, which can remain stationary and not rotate the shaft 215. The lower threshold may represent the locomotive engine 205 operation at idle in one embodiment. Because the engine assisting apparatus 245 is active at the lower threshold and remains active above the lower threshold until exceeding the upper threshold, the ECU 251 directs the engine assisting apparatus 245 to continue rotating the engine shaft 115. The gear boxes 202 and 242 mesh together, so that the APU 250 rotates the locomotive engine shaft 215. The traction motors 240 can utilize the DC output from the ESD 255. The traction motors 240 utilize the converted electric energy to rotate mechanically coupled axles, thereby propelling the vehicle. Optionally, the DC-DC converter 260 converts at least some of the electric energy from the rectifier 231 to recharge the ESD 255 as required. Alternatively, APU 250 rotates the engine shaft 215 to power one or more other loads onboard the vehicle.

In operation, a locomotive may begin operating at idle or N0. During idle, the ECU 251 may direct the engine assisting apparatus 245 to rotate the engine shaft 215 via the motor shaft 243 and the gear boxes 242 and 202. The ECU may also direct the fuel injector(s) 210 to provide no fuel to the locomotive engine 205, thereby causing the engine 205 to not rotate the engine shaft 215. The locomotive operator may increase the speed of the locomotive to N1, N2, or N3. The ECU may then direct the fuel injector(s) 210 to provide fuel for one or more, but not all, of the cylinders of the locomotive engine 205. During operation at notch N1, N2, or N3, both the locomotive engine 205 and the engine assisting apparatus 245 may rotate the engine shaft 215. The locomotive operator may continue to increase the speed of the locomotive, during which the ECU 151 may direct the fuel injector(s) 210 to provide more fuel to the cylinders of the locomotive engine 205. The ECU 251 will direct the assisting apparatus to continue assisting the locomotive engine 205 while the locomotive operates at N3 or below. In this example, an upper threshold may be N3. Once the upper threshold is exceeded, the ECU 251 may direct the engine assisting apparatus 245 to no longer rotate the engine shaft 215 without assistance from the engine assisting apparatus 145. However, as the locomotive slows down, the ECU 251 may evaluate the need to assistance and direct the engine assisting apparatus 245 and the locomotive engine 205 to accordingly rotate or not rotate the locomotive engine shaft 215.

Figure 3:
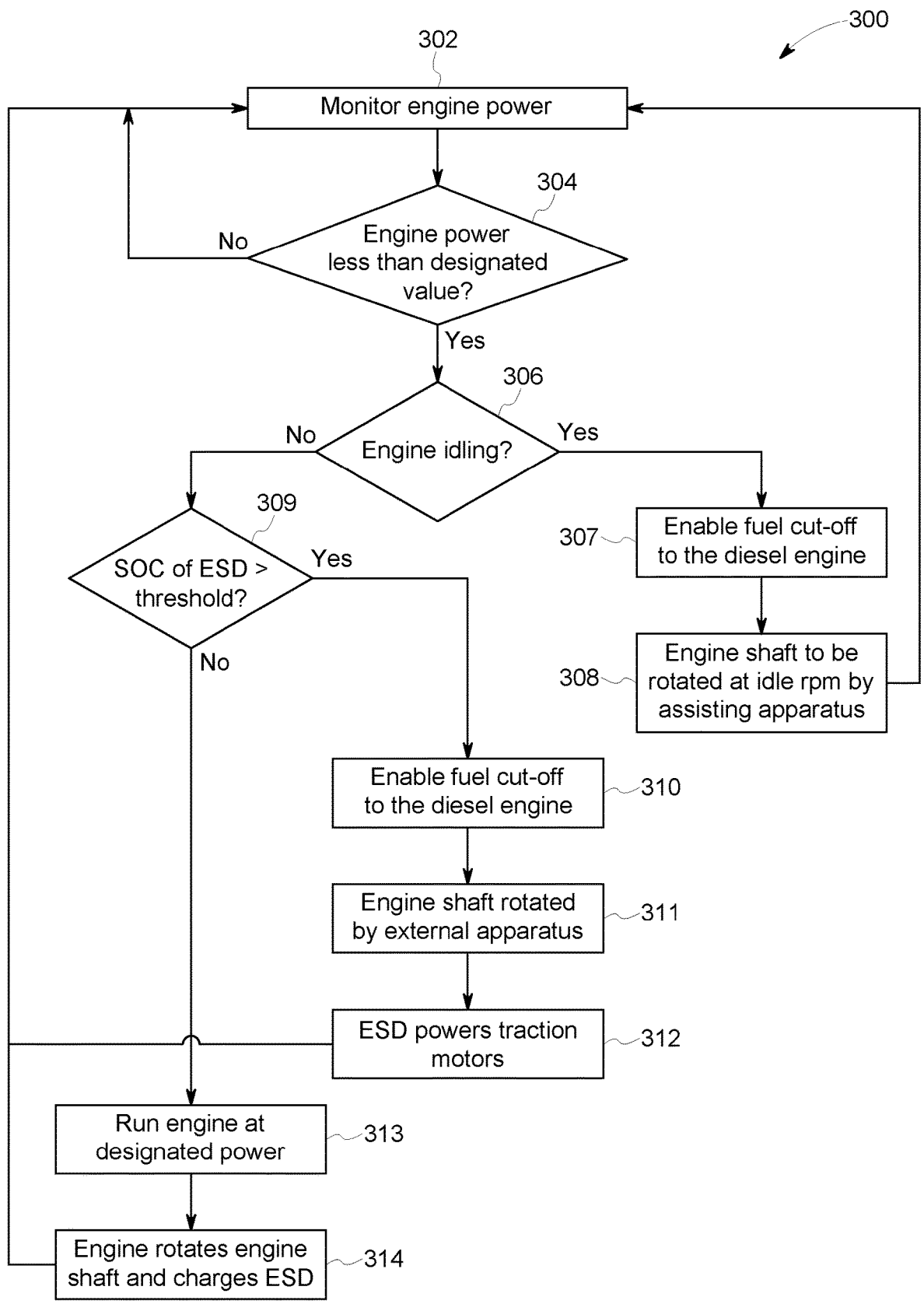
FIG. 3 illustrates a flowchart of one embodiment of a method for monitoring and controlling a locomotive propulsion system.

FIG. 3 illustrates a flowchart of one embodiment of a method 300 for operating a propulsion system of a vehicle. The method 300 may describe automated control of one or more embodiments of the engine assisting apparatuses described above by the ECUs described above. At 302, an engine output parameter of the vehicle engine is monitored. For example, the power output of the engine can be measured or determined by the ECU based on the current throttle setting of the engine. Alternatively, the engine speed and/or another engine output parameter described herein can be measured.

At 304, a determination is made as to whether the engine output parameter is greater than an upper designated threshold. In one embodiment, the ECU can determine if the engine power is greater than an upper designated value, such as an upper designated throttle setting. If the engine output parameter is greater than this upper threshold, then the ECU may determine that the engine alone should continue rotating the engine shaft to cause the power-generating devices to power the traction motors (and propel the vehicle). As a result, flow of the method 300 can return to 302 so the engine output parameter can continue to be monitored to determine whether (and if) the parameter drops below the upper threshold.

At 306, a determination is made as to whether the engine output parameter is greater than a lower designated threshold. In one embodiment, the ECU can determine if the engine is operating at an idle setting. If the engine output parameter is not greater than the lower designated threshold (e.g., the engine is operating at idle), then flow of the method 300 can proceed toward 307. Otherwise, if the engine output parameter is greater than the lower designated threshold (e.g., the engine is not operating at idle but is operating at an output parameter that is not greater than the upper threshold), then flow of the method 300 can proceed from 306 toward 309.

At 307, fuel is cut off to the engine. For example, the ECU may de-fuel the engine by directing the fuel injectors to stop injecting fuel into one or more (or all) of the cylinders of the engine. At 308, the engine shaft is rotated by the engine assisting apparatus. The ECU can direct the assisting apparatus to activate and begin rotating the engine shaft, as described above. The assisting apparatus can rotate the shaft so that the power-generating device(s) connected with the engine shaft continue to generate electric current to power one or more loads on the vehicle, such as computing devices, fans, blowers, HVAC systems, etc. Flow of the method 300 can then return toward 302 or may terminate.

Returning to the description of the decision performed at 306, if the engine is operating at an output parameter that is greater than the lower threshold, then a determination is made as to whether a state of charge (SOC) of one or more of the ESDs is greater than a charge threshold. For example, if the ECU determines that the engine is not idling, then the ECU can examine how much energy is stored in the ESD. If the state of charge of the ESDs is greater than a threshold (e.g., greater than 50%, greater than 30%, or greater than 10%), then there may be enough energy stored in the ESD to power the assisting apparatus to assist the engine with rotating the engine shaft. As a result, flow of the method 300 can proceed toward 310.

At 310, fuel is cut-off to the engine. For example, the ECU can direct one or more (or all) of the fuel injectors to stop injecting fuel into one or more (or all) of the cylinders in the engine. At 311, the engine shaft is rotated by an external apparatus. For example, the ECU can direct one or more of the assisting apparatuses described herein to activate and begin rotating the shaft of the engine without the engine rotating or contributing to rotation of the engine shaft. At 312, the traction motor(s) of the vehicle are powered by the ESDs. For example, batteries onboard the vehicle can power the traction motors of the vehicle to continue propelling the vehicle. Optionally, the traction motors can be at least partially powered with current generated by the power-generating devices that are coupled to the engine shaft (that is rotated by the engine assisting apparatus). Flow of the method 300 can return toward 302.

Returning to the description of the determination made at 309, if the state of charge of the ESDs is not greater than the charge threshold, then there may not be enough stored energy in the ESDs to power the traction motors (and continue propelling the vehicle). As a result, flow of the method 300 can proceed toward 313. At 313, the engine operates at a designated power output. For example, the ECU can direct the engine to continue operating at a designated or selected throttle setting. The ECU can direct some or all of the fuel injectors to continue supplying fuel to some or all of the engine cylinders. At 314, the engine rotates the engine shaft to charge the ESDs. For example, the engine can continue operating to rotate the engine shaft. This causes the power-generating devices to continue generating electric current that is supplied to the ESD for charging the ESDs. Flow of the method 300 can return toward 302. Optionally, flow of the method 300 can proceed from 314 to 309. For example, another determination may be made as to whether the additional charging of the ESDs brings the SOC of the ESDs above the threshold at 309.

In one embodiment, a locomotive propulsion system can include an engine assisting apparatus. The locomotive propulsion system also can include an engine control unit configured to monitor a speed at which an engine of a locomotive rotates a shaft of the engine, the shaft of the engine operatively coupled with one or more power-generating devices that convert rotation of the shaft into electric current that powers one or more traction motors that propel the locomotive. The engine control unit can also be configured to determine whether the speed at which the engine rotates the shaft decreases to or below a designated lower threshold that is greater than an idle speed of the engine, to direct one or more fuel injectors of the engine to stop supplying fuel to one or more cylinders of the engine responsive to the speed at which the engine rotates the shaft decreasing to or below the designated lower threshold, and to direct the assisting motor to begin rotating the shaft of the engine responsive to (a) the speed at which the engine rotates the shaft decreasing to or below the designated lower threshold and (b) the one or more fuel injectors stopping supply of the fuel to the one or more cylinders of the engine. The system also can include an assisting apparatus configured to be operatively interconnected with a locomotive engine shaft.

Optionally, the locomotive propulsion system can include one or more energy storage devices that are configured to be charged by the one or more traction motors during regenerative braking of the locomotive. The assisting motor can be powered by the one or more energy storage devices that are charged by the one or more traction motors.

Optionally, the engine control unit is configured to determine whether the speed at which the engine rotates the shaft is at least as fast as the designated lower threshold but slower than a designated upper threshold. The engine control unit can also be configured to direct the assisting motor to continue rotating the shaft of the engine and to direct the one or more fuel injectors to supply fuel to the one or more cylinders of the engine so that the shaft is rotated by both the assisting motor and the engine responsive to the speed at which the engine rotates the shaft being at least as fast as the designated lower threshold but slower than the designated upper threshold.

In one embodiment, a locomotive propulsion system can include an assisting apparatus configured to be coupled with a shaft of a locomotive engine to rotate the shaft of the engine while a locomotive moves. The locomotive can also include an engine control unit configured to monitor a power setting of the engine, the engine control unit configured to determine whether the power setting of the engine is no greater than a designated upper threshold, the engine control unit configured to direct one or more fuel injectors of the engine to stop fueling the engine responsive to the power setting of the engine dropping to or below the upper threshold, the engine control unit also configured to direct the assisting apparatus to begin rotating the shaft of the engine responsive to the power setting of the engine dropping to or below the upper threshold.

Optionally, the engine control unit also can be configured to determine whether the power setting of the engine is no greater than a designated lower threshold, can be configured to direct the one or more fuel injectors to stop fueling the engine, and can be configured to direct the assisting apparatus to begin rotating the shaft of the engine responsive to the power setting of the engine dropping below the upper threshold and being no greater than the lower threshold.

The engine control unit can be configured to determine whether a state of charge of one or more electric storage devices onboard the locomotive is greater than a charge threshold. The engine control unit also can be configured (a) to direct the one or more fuel injectors to stop fueling the engine, (b) to direct the assisting apparatus to begin rotating the shaft of the engine, and (c) to direct the one or more electric storage devices to power one or more traction motors for propelling the locomotive responsive to the power setting of the engine dropping below the upper threshold, the power setting being no greater than the lower threshold, and the state of charge being no greater than the charge threshold.

Further, the engine control unit can be configured to determine whether a state of charge of one or more electric storage devices onboard the locomotive is greater than a charge threshold. Additionally, the engine control unit can be configured to direct the one or more fuel injectors to continue fueling the engine to charge the one or more electric storage devices responsive to the power setting of the engine dropping below the upper threshold, the power setting being no greater than the lower threshold, and the state of charge being no greater than the charge threshold.

Furthermore, the engine control unit can be configured to direct the one or more fuel injectors to continue fueling the engine and to direct the assisting apparatus to assist in rotating the shaft of the engine responsive to the power setting of the engine being no greater than the upper threshold but greater than the lower threshold. Moreover, the lower threshold can correspond to the engine operating at an idle setting, the assisting apparatus can be one or more of a motor or an additional engine, the power setting of the engine can represent a throttle notch setting, and the power setting of the engine can represent an engine speed.

In one embodiment, a method includes monitoring a power setting of an engine onboard a locomotive, determining whether the power setting of the engine is no greater than a designated upper threshold, directing one or more fuel injectors of the engine to stop fueling the engine responsive to the power setting of the engine dropping to or below the upper threshold, and directing an assisting apparatus onboard the locomotive to begin rotating a shaft of the engine responsive to the power setting of the engine dropping to or below the upper threshold.

Optionally, the method can include determining whether the power setting of the engine is no greater than a designated lower threshold and directing the assisting apparatus to begin rotating the shaft of the engine responsive to the power setting of the engine dropping below the upper threshold and being no greater than the lower threshold.

The method can further include determining whether a state of charge of one or more electric storage devices onboard the locomotive is greater than a charge threshold; directing the one or more fuel injectors to stop fueling the engine responsive to the power setting of the engine dropping below the upper threshold, the power setting being no greater than the lower threshold, and the state of charge being no greater than the charge threshold; directing the assisting apparatus to begin rotating the shaft of the engine responsive to the power setting of the engine dropping below the upper threshold, the power setting being no greater than the lower threshold, and the state of charge being no greater than the charge threshold; and directing the one or more electric storage devices to power one or more traction motors for propelling the locomotive responsive to the power setting of the engine dropping below the upper threshold, the power setting being no greater than the lower threshold, and the state of charge being no greater than the charge threshold.

Additionally, the method can include determining whether a state of charge of one or more electric storage devices onboard the locomotive is greater than a charge threshold and directing the one or more fuel injectors to continue fueling the engine to charge the one or more electric storage devices responsive to the power setting of the engine dropping below the upper threshold, the power setting being no greater than the lower threshold, and the state of charge being no greater than the charge threshold.

Further, the method can include directing the one or more fuel injectors to continue fueling the engine responsive to the power setting of the engine being no greater than the upper threshold but greater than the lower threshold and directing the assisting apparatus to assist in rotating the shaft of the engine responsive to the power setting of the engine being no greater than the upper threshold but greater than the lower threshold.

Furthermore, the method can include the lower threshold corresponding to the engine operating at an idle setting and the power setting of the engine representing one or more of a throttle notch setting of the engine or an engine speed.

In an embodiment, a vehicle (e.g., a locomotive, bus, haul truck, etc.) includes an engine, an assisting apparatus as described herein, and an engine control unit. The vehicle also includes one or more starting or hotel batteries or battery arrays, and an energy storage device as described herein. The energy storage device (e.g., a second battery) is separate and distinct from (i.e., not a part of) the starting or hotel batteries. The starting or hotel batteries are configured to (i) provide electrical power for engine cranking at startup, and/or (ii) provide power to one or more electronics devices and/or hotel loads onboard the vehicle when the vehicle alternator is not generating electrical power under operation of the engine. For example, the starting or hotel batteries may be an array of cells outputting (in total) 64-72V DC @ 500+ ampere hours. The vehicle is configured so that the starting or hotel batteries are not used for powering traction motors. The vehicle may be configured so that the energy storage device is not used for powering traction motors in any manner, e.g., the energy storage device powers an assisting motor to rotate the engine shaft at idle or other speeds only when the vehicle is stationary, so that even if the shaft is being rotated to drive an alternator, the electrical power generated by the alternator is not being used to power the traction motors. Alternatively, the vehicle may be configured so that the energy storage device is used for powering traction motors only by way of the energy storage device powering the assisting motor to rotate the engine shaft and the engine shaft in turn driving an alternator that generates electrical power, which may then be used to run the traction motor or motors. In both instances of these embodiments, the energy storage device is not used to directly power the traction motor(s) ('directly' meaning converting a DC output of the battery with an inverter to generate a DC or AC electrical power waveform configured to drive a motor). However, the energy storage device may be charged using electrical power generated by the traction motors during dynamic braking. Further in these embodiments, the vehicle lacks (i.e., does not have onboard) any batteries or other energy storage devices for directly powering the traction motors. That is, the vehicle includes the starting or hotel batteries and the energy storage device for powering the assisting apparatus, but no batteries for directly powering the traction motors. Thus, it may be possible to outfit a vehicle in a "mild hybrid" manner with an assisting apparatus and relatively modest-sized energy storage device (e.g., like the traction battery used in a typical hybrid passenger automobile, such as an Li-ion or NiMH battery), where the energy storage device is charged during regenerative braking but is only used to power the assisting motor for rotating the engine shaft, e.g., at idle. Thereby, fuel usage may be reduced (relative to only combusting fuel to idle the engine) without having to outfit the vehicle with a relatively very large battery array/system such as would be typically required for directly powering the traction motor(s).

In any of the embodiments herein, the assisting apparatus (e.g., assisting motor) may be coupled to the engine shaft, directly or indirectly, via a clutch or similar mechanism, such as a clutch integrated into one of the gearboxes, so that the apparatus (e.g., motor) is rotationally disconnected from the engine shaft when the apparatus (e.g., motor) is not being controlled to rotate the engine shaft.

In any of the embodiments herein, an operator interface may include a control to selectively disable using the assisting apparatus, e.g., so that at idle the engine is still fueled for combustion and the motor (or the like) does not assist. In such embodiments, the engine control unit (or another vehicle controller) may be configured to track the amount of time the control is operated to disable the assisting apparatus, and/or to communicate the amount of time the control is operated to disable the assisting apparatus to an off-board location, such as a dispatch or operations center.

In any of the embodiments herein, the engine control unit may be configured to disable and enable the assisting apparatus (in terms of it being controlled to rotate the engine shaft or not) based on received signals indicative of one or more designated operating conditions of the vehicle unrelated to controlled engine speed/throttle or ESD state of charge, e.g., vehicle location, weather and other ambient environmental conditions, motor or assisting apparatus operational condition, length of time at idle, etc. For example, the system may be configured for assisting apparatus use only if the vehicle is idled for longer than a designated threshold time period, such as thirty seconds, or one minute, or five minutes (e.g., the time period may be reflective of what are considered transitory stops, such as a vehicle stopping at a stop sign, where it may be undesired to de-fuel the engine for such a relatively short time period).

In an embodiment, a vehicle propulsion system for a vehicle includes an engine, an assisting apparatus, and an engine control unit. The assisting apparatus includes an electric motor that is operably coupled to a shaft of the engine. The engine control unit is configured, responsive to the engine operating at idle, to de-fuel the engine (so no fuel is combusted by the engine), and to concurrently control the motor so that the motor is electrically powered to rotate the shaft of the engine at the same speed (idle speed) as if the engine was combusting fuel for operating at idle. The engine control unit is further configured, responsive to generation of a control signal for the engine to operate above idle, to turn off the motor and control fueling of the engine as per the control signal. The motor may be powered by an ESD that is charged, in whole or in part, with electrical power that is generated by a traction motor during dynamic or regenerative braking of the vehicle. In other embodiments, de-fueling is also contingent upon the vehicle being stopped/stationary (not moving forward or in reverse along a route), that is, the engine control unit may be configured to de-fuel the engine and control the motor to rotate the engine shaft responsive only to the occurrence of both the engine operating at idle and the vehicle being stationary.

In an embodiment, a vehicle propulsion system for a vehicle includes an engine, an assisting apparatus, and an engine control unit. The assisting apparatus includes an electric motor that is operably coupled to a shaft of the engine. The engine control unit is configured, responsive to the engine operating at idle, to de-fuel the engine (so no fuel is combusted by the engine), and to concurrently control the motor so that the motor is electrically powered to rotate the shaft of the engine at the same speed (idle speed) as if the engine was combusting fuel for operating at idle. The engine control unit is further configured, responsive to generation of a first control signal for the engine to operate above idle but below a first designated power or speed threshold (that is greater than idle), to control powering of the motor and control fueling of the engine concurrently so that the motor and fuel combustion together rotate the engine shaft at a power or speed level corresponding to the first control signal (i.e., at a shaft speed as if the shaft was being rotated by fuel combustion only, according to the first control signal). The engine control unit is further configured, responsive to generation of a second control signal for the engine to operate above the first designated power or speed threshold, to turn off the motor and fuel the engine according to the second control signal (i.e., engine shaft rotation by fuel combustion only). The motor may be powered by an ESD that is charged, in whole or in part, with electrical power that is generated by a traction motor during dynamic or regenerative braking of the vehicle. In other embodiments, de-fueling is also contingent upon the vehicle being stopped/stationary (not moving forward or in reverse along a route), that is, the engine control unit may be configured to de-fuel the engine and control the motor to rotate the engine shaft responsive to the occurrence of both the engine operating at idle and the vehicle being stationary.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments.

Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all the subject matter of the above description or shown in the accompanying drawings shall be interpreted merely as examples illustrating the inventive concept herein and shall not be construed as limiting the inventive subject matter.

As used herein, a structure, limitation, or element that is "configured to" perform a task or operation is particularly structurally formed, constructed, programmed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, programming of the structure or element to perform the corresponding task or operation in a manner that is different from an "off-the-shelf" structure or element that is not programmed to perform the task or operation, and/or denotes structural requirements of any structure, limitation, or element that is described as being "configured to" perform the task or operation.

What is claimed is:

1. A vehicle propulsion system comprising:
an engine control unit configured to monitor a speed at which an engine of a vehicle rotates a shaft of the engine, the shaft of the engine operatively coupled with one or more power-generating devices that convert rotation of the shaft into electric current that powers one or more traction motors that propel the vehicle;
an assisting motor configured to be operatively coupled with the shaft of the engine,
wherein the engine control unit is configured to determine whether the speed at which the engine rotates the shaft decreases to or below a designated lower threshold that is greater than or equal to an idle speed of the engine;
wherein the engine control unit is configured to direct a fuel system of the engine to stop supplying fuel to one or more cylinders of the engine responsive to the speed at which the engine rotates the shaft decreasing to or below the designated lower threshold; and
wherein the engine control unit is configured to direct the assisting motor to begin rotating the shaft of the engine responsive to (a) the speed at which the engine rotates the shaft decreasing to or below the designated lower threshold and (b) the fuel system stopping supply of the fuel to the one or more cylinders of the engine.

2. The vehicle propulsion system of claim 1, further comprising one or more energy storage devices that are configured to be charged by the one or more traction motors during regenerative braking of the vehicle.

3. The vehicle propulsion system of claim 2, wherein the assisting motor is configured to be powered by the one or more energy storage devices that are charged by the one or more traction motors.

4. The vehicle propulsion system of claim 1, wherein the engine control unit is configured to determine whether the speed at which the engine rotates the shaft is at least as fast as the designated lower threshold but slower than a designated upper threshold; and
wherein the engine control unit is configured to direct the assisting motor to continue rotating the shaft of the engine and to direct the fuel system to supply fuel to the one or more cylinders of the engine so that the shaft is rotated by both the assisting motor and the engine responsive to the speed at which the engine rotates the shaft being at least as fast as the designated lower threshold but slower than the designated upper threshold.

5. A vehicle propulsion system comprising: an engine;
an assisting apparatus configured to be coupled with a shaft of a vehicle engine to rotate the shaft of the engine;
an engine control unit configured to monitor a power setting of the engine;
one or more starting batteries;
an energy storage device (ESD); and
one or more traction motors for propelling the vehicle;
wherein the engine control unit also is configured to determine whether the power setting of the engine is no greater than a designated lower threshold, and
wherein the engine control unit is configured to direct the fuel system to stop fueling the one or more cylinders of the engine and to direct the assisting apparatus to begin rotating the shaft of the engine responsive to the power setting of the engine dropping below an upper threshold and being no greater than the lower threshold.

6. The vehicle propulsion system of claim 5, wherein the engine control unit is configured to determine whether a state of charge of the one or more electric storage devices onboard the vehicle is greater than a charge threshold, and wherein the engine control unit is configured (a) to direct the fuel system to stop fueling the one or more cylinders of the engine, (b) to direct the assisting apparatus to begin rotating the shaft of the engine, and (c) to direct the one or more electric storage devices to power the one or more traction motors for propelling the vehicle responsive to the power setting of the engine dropping below the upper threshold, the power setting being no greater than the lower threshold, and the state of charge being no greater than the charge threshold.

7. The vehicle propulsion system of claim 5, wherein the engine control unit is configured to determine whether a state of charge of the one or more electric storage devices onboard the vehicle is greater than a charge threshold, and wherein the engine control unit is configured to direct the fuel system to continue fueling the one or more cylinders of the engine to charge the one or more electric storage devices responsive to the power setting of the engine dropping below the upper threshold, the power setting being no greater than the lower threshold, and the state of charge being no greater than the charge threshold.

8. The vehicle propulsion system of claim 5, wherein the engine control unit is configured to direct the fuel system to continue fueling the one or more cylinders of the engine and to direct the assisting apparatus to assist in rotating the shaft of the engine responsive to the power setting of the engine being no greater than the upper threshold but greater than the lower threshold.

9. The vehicle propulsion system of claim 5, wherein the lower threshold corresponds to the engine operating at an idle setting.

10. The vehicle propulsion system of claim 5, wherein the assisting apparatus is one or more of a motor or an additional engine.

11. The vehicle propulsion system of claim 5, wherein the power setting of the engine represents one or more of a throttle notch setting or an engine speed.

12. The vehicle propulsion system of claim 5, wherein
the ESD is separate and distinct from the one or more starting batteries;
the one or more starting batteries are configured to (i) provide electrical power for engine cranking at startup and (ii) provide power to one or more electronics devices or loads onboard the vehicle when a vehicle alternator is not generating electrical power under operation of the engine;
electrical power generated by the alternator is not being used to power the one or more traction motors;
the starting batteries are not used for powering the one or more traction motors; the ESD is not used for powering the one or more traction motors;
the ESD is charged by electrical power generated by the traction motors during regenerative braking; and
the one or more traction motors are powered by the assisting apparatus.

13. A method comprising:
monitoring a power setting of an engine onboard a vehicle;
determining whether the power setting of the engine is no greater than a designated upper threshold;
directing a fuel system of the engine to stop fueling one or more cylinders of the engine responsive to the power setting of the engine dropping to or below the upper threshold; and
directing an assisting apparatus onboard the vehicle to begin rotating a shaft of the engine responsive to the power setting of the engine dropping to or below the upper threshold;
wherein the vehicle includes one or more traction motors for propelling the vehicle.

14. The method of claim 13, further comprising:
determining whether the power setting of the engine is no greater than a designated lower threshold; and
directing the assisting apparatus to begin rotating the shaft of the engine responsive to the power setting of the engine dropping below the upper threshold and being no greater than the lower threshold.

15. The method of claim 14, further comprising:
determining whether a state of charge of one or more electric storage devices onboard the vehicle is greater than a charge threshold;
directing the fuel system to stop fueling the one or more cylinders of the engine responsive to the power setting of the engine dropping below the upper threshold, the power setting being no greater than the lower threshold, and the state of charge being no greater than the charge threshold;
directing the assisting apparatus to begin rotating the shaft of the engine responsive to the power setting of the engine dropping below the upper threshold, the power setting being no greater than the lower threshold, and the state of charge being no greater than the charge threshold; and
directing the one or more electric storage devices to power the one or more traction motors for propelling the vehicle responsive to the power setting of the engine dropping below the upper threshold, the power setting being no greater than the lower threshold, and the state of charge being no greater than the charge threshold.

16. The method of claim 14, further comprising:
determining whether a state of charge of one or more electric storage devices onboard the vehicle is greater than a charge threshold; and
directing the fuel system to continue fueling the one or more cylinders of the engine to charge the one or more electric storage devices responsive to the power setting of the engine dropping below the upper threshold, the power setting being no greater than the lower threshold, and the state of charge being no greater than the charge threshold.

17. The method of claim 14, further comprising:
directing the fuel system to continue fueling the one or more cylinders of the engine responsive to the power setting of the engine being no greater than the upper threshold but greater than the lower threshold; and
directing the assisting apparatus to assist in rotating the shaft of the engine responsive to the power setting of the engine being no greater than the upper threshold but greater than the lower threshold.

18. The method of claim 14, wherein the lower threshold corresponds to the engine operating at an idle setting.

19. The method of claim 13, wherein the power setting of the engine represents one or more of a throttle notch setting of the engine or an engine speed.

\* \* \* \* \*